US012755755B1

(12) United States Patent
Chen et al.

(10) Patent No.: US 12,755,755 B1
(45) Date of Patent: Oct. 6, 2026

(54) HARD DISK DRIVE AND WRITE HEADS HAVING REFILLED STRUCTURES AT SIDE EDGES OF AN ASSIST DEVICE

(71) Applicant: Headway Technologies, Inc., Milpitas, CA (US)

(72) Inventors: Wenyu Chen, San Jose, CA (US); Minghui Yu, Fremont, CA (US); Yewhee Chye, Hayward, CA (US); Shohei Kawasaki, Sunnyvale, CA (US); Tetsuya Roppongi, San Jose, CA (US); Shehrin Sayed, Fremont, CA (US); Kazuki Sato, Sunnyvale, CA (US); Yuhui Tang, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 19/357,490

(22) Filed: Oct. 14, 2025

(51) Int. Cl.

| | |
|---|---|
| ***G11B 5/31*** | (2006.01) |
| ***G11B 5/11*** | (2006.01) |
| ***G11B 5/187*** | (2006.01) |
| ***G11B 5/48*** | (2006.01) |
| *G11B 5/00* | (2006.01) |

(52) U.S. Cl.
CPC ................ *G11B 5/315* (2013.01); *G11B 5/11* (2013.01); *G11B 5/187* (2013.01); *G11B 5/4866* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 6,785,092 | B2 | 8/2004 | Covington et al. | |
| 8,264,799 | B2 | 9/2012 | Akiyama et al. | |
| 8,995,088 | B1 | 3/2015 | Boone et al. | |
| 9,064,534 | B1 * | 6/2015 | Zheng | G11B 5/3163 |
| 9,230,567 | B1 * | 1/2016 | Fujita | G11B 5/315 |
| 9,558,763 | B1 * | 1/2017 | Luo | G11B 5/1278 |
| 11,043,234 | B2 | 6/2021 | Wu | |
| 11,056,134 | B1 * | 7/2021 | Eppler | G11B 5/1278 |
| 11,100,946 | B1 | 8/2021 | Le et al. | |
| 11,417,356 | B1 * | 8/2022 | Asif Bashir | G11B 5/187 |
| 11,508,401 | B1 * | 11/2022 | Asif Bashir | G11B 5/3116 |
| 11,651,783 | B1 * | 5/2023 | Goncharov | G11B 5/3912 360/236.4 |

(Continued)

OTHER PUBLICATIONS

Zhu, J. et al., "Microwave Assisted Magnetic Recording", IEEE Transactions on Magnetics, vol. 44, No. 1, pp. 125-131, Jan. 2008.

(Continued)

*Primary Examiner* — Peter Vincent Agustin
(74) *Attorney, Agent, or Firm* — DLA Piper LLP (US)

(57) ABSTRACT

The present embodiments relate to write head designs with metal layers at sides of an assist device to improve heat conductance so that the temperature rise inside and around the assist device becomes lower. The designs can also allow additional current into the assist device to maximize the assist. In some instances, a set of insulator layers are disposed between the assist device and the metal layers. In other instances, an additional metal layer can be disposed between the insulator layers and the assist device to enhance the charge current induced assist of the write head.

20 Claims, 7 Drawing Sheets

(56) References Cited

U.S. PATENT DOCUMENTS

| | | | | |
|---|---|---|---|---|
| 12,094,497 | B1 | 9/2024 | Sayed et al. | |
| 2005/0190479 | A1* | 9/2005 | Terris | G11B 5/1278 |
| 2009/0262636 | A1* | 10/2009 | Xue | G11B 5/314 369/126 |
| 2012/0257305 | A1* | 10/2012 | Tang | G11B 5/3146 29/603.07 |
| 2018/0075868 | A1 | 3/2018 | Koui et al. | |
| 2023/0044051 | A1* | 2/2023 | Lam | G11B 5/11 |
| 2024/0274152 | A1* | 8/2024 | Hirata | G11B 5/11 |
| 2024/0296860 | A1 | 9/2024 | Liu et al. | |

OTHER PUBLICATIONS

Western Digital, "Energy-Assisted Magnetic Recording Technology for Higher HDD Capacities", Technical Brief, 6 pages, Oct. 2020.

* cited by examiner

HARD DISK DRIVE AND WRITE HEADS HAVING REFILLED STRUCTURES AT SIDE EDGES OF AN ASSIST DEVICE

TECHNICAL FIELD

Embodiments of the invention relate to the field of data storage devices. More particularly, embodiments of the invention relate to a write head of a hard disk drive with refilled side edge structures that provide improved thermal conductivity.

BACKGROUND

A magnetic recording medium (e.g., a magnetic disk) can store magnetic bits representing digital data. A magnetic writer can be part of a hard disk drive (HDD) to write digital data to the magnetic recording medium.

As data areal density in hard disk drives (HDD) writing increases, both write heads and media bits may be generally needed to be made smaller. However, with the decreasing sizes of the writers, their writability degrades. Some write head designs are configured to assist writing, and apart from the thermally assisted magnetic recording (TAMR) that has a completely different geometry from that of the perpendicular magnetic recording (PMR) without assist, there are three major categories that belong to the current assisted magnetic recording.

A first example category can use spin torque devices to generate high frequency field to help writing, such as microwave assisted magnetic recording (MAMR). A second example category can include using spin torque to reverse a layer in the device in order to guide the magnetic flux more concentrated from the main pole, such as spin torque reversal assisted magnetic recording (STRAMR). A third example category can include using a charge current to generate Oested fields for improving jitter of the writer.

While improvements have been made, there is a continuing need to increase the density of write heads.

SUMMARY

The present embodiments relate to write head designs with metal layers at sides of an assist device to improve heat conductance so that the temperature rise inside and around the assist device becomes lower. The designs can also allow additional current into the assist device to maximize the assist. In some instances, a set of insulator layers are disposed between the assist device and the metal layers. In other instances, a first metal layer can be disposed between the insulator layers and the assist device to enhance the charge current induced assist of the write head.

In a first example embodiment, a write head is described. The write head can include a main pole (MP). The write head can also include side shield portions disposed adjacent to the main pole. The write head can also include a trailing shield (TS). The write head can also include an assist device located in a write gap between the MP and the TS.

The write head can also include a set of insulator layers disposed on sides of the assist device and over part of an upper surface of the side shield portions. The write head can also include a set of metal layers disposed over the insulator layer.

In some instances, each of the set of metal layers disposed at the TS on a first side and on the set of insulator layers on a second side.

In some instances, each of the set of insulator layers disposed adjacent to the assist device and the side shield portions at a first side and the set of metal layers on a second side.

In some instances, the write head further comprises a current source to provide a current from the TS to the MP through the assist device, wherein heat generated by the current in the assist device can be well transmitted to the set of metal layers under a same applied current in the assist device so that a temperature rise around the assist device is reduced and a device reliability is improved.

In some instances, the assist device is etched via an ion-beam etching process to remove a portion of the assist device prior to depositing the set of insulation layers.

In some instances, the write head further comprises a set of additional metal layers disposed over the side shield portions and the assist device on a first side and adjacent to the set of insulator layers on a second side.

In some instances, wherein any of the set of metal layers and the set of additional metal layers comprise a any of a set of metals including Ruthenium, Titanium, Tantalum, a Nickel-Chromium alloy, or a multi-layer of any of the set of metals.

In some instances, the set of metal layers comprise a plurality of metal layer with alternative positive and negative mechanical stress.

In some instances, the set of metal layers has a thickness greater than that of the set of insulator layers.

In some instances, the write head is part of a recording device in a head gimbal assembly, wherein the recording device is connected to a slider and a load beam, wherein the load beam is connected to a suspension configured to support the recording device and the slider.

In another example embodiment, a head gimbal assembly is described. The head gimbal assembly can include a recording head including a slider and a device connected to the slider.

The device can include a main pole (MP) and side shield portions disposed adjacent to the main pole. The device can also include a trailing shield (TS) and an assist device located in a write gap between the MP and the TS. The device can also include a set of insulator layers disposed on sides of the assist device and over part of an upper surface of the side shield portions. The device can also include a set of metal layers disposed over the insulator layer.

The head gimbal assembly can also include a load beam connected to the recording head. The head gimbal assembly can also include a suspension connected to the load beam and configured to support the recording head.

In some instances, each of the set of metal layers disposed at the TS on a first side and on the set of insulator layers on a second side.

In some instances, each of the set of insulator layers disposed adjacent to the assist device and the side shield portions at a first side and the set of metal layers on a second side.

In some instances, the write head can further include a current source to provide a current from the TS to the MP through the assist device, wherein heat generated by the current in the assist device can be well transmitted to the set of metal layers under a same applied current in the assist device so that a temperature rise around the assist device is reduced and a device reliability is improved.

In some instances, the write head can further include a set of additional metal layers disposed over the side shield portions and the assist device on a first side and adjacent to the set of insulator layers on a second side.

In some instances, any of the set of metal layers and the set of additional metal layers comprise a any of a set of metals including Ruthenium, Titanium, Tantalum, a Nickel-Chromium alloy, or a multi-layer of any of the set of metals.

In another example, a method for manufacturing a write head is described. The method can include forming a main pole. The method can also include disposing an assist device located in a write gap over the main pole. The method can also include forming a set of insulator layers on sides of the assist device and over part of an upper surface of the side shield portions. The method can also include disposing a set of metal layers disposed over the insulator layer.

In some instances, the method can further include disposing a trailing shield over the set of metal layers and the assist device.

In some instances, the method can further include disposing a set of metal layers between the set of insulator layers on a first side and over the part of the upper surface of the side shield portions and the assist device on a second side.

In some instances, the method can further include connecting a current source to the write head to provide a current from the TS to the MP through the assist device, wherein heat generated by the current in the assist device can be well transmitted to the set of metal layers under a same applied current in the assist device so that a temperature rise around the assist device is reduced and a device reliability is improved.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Figure 1:
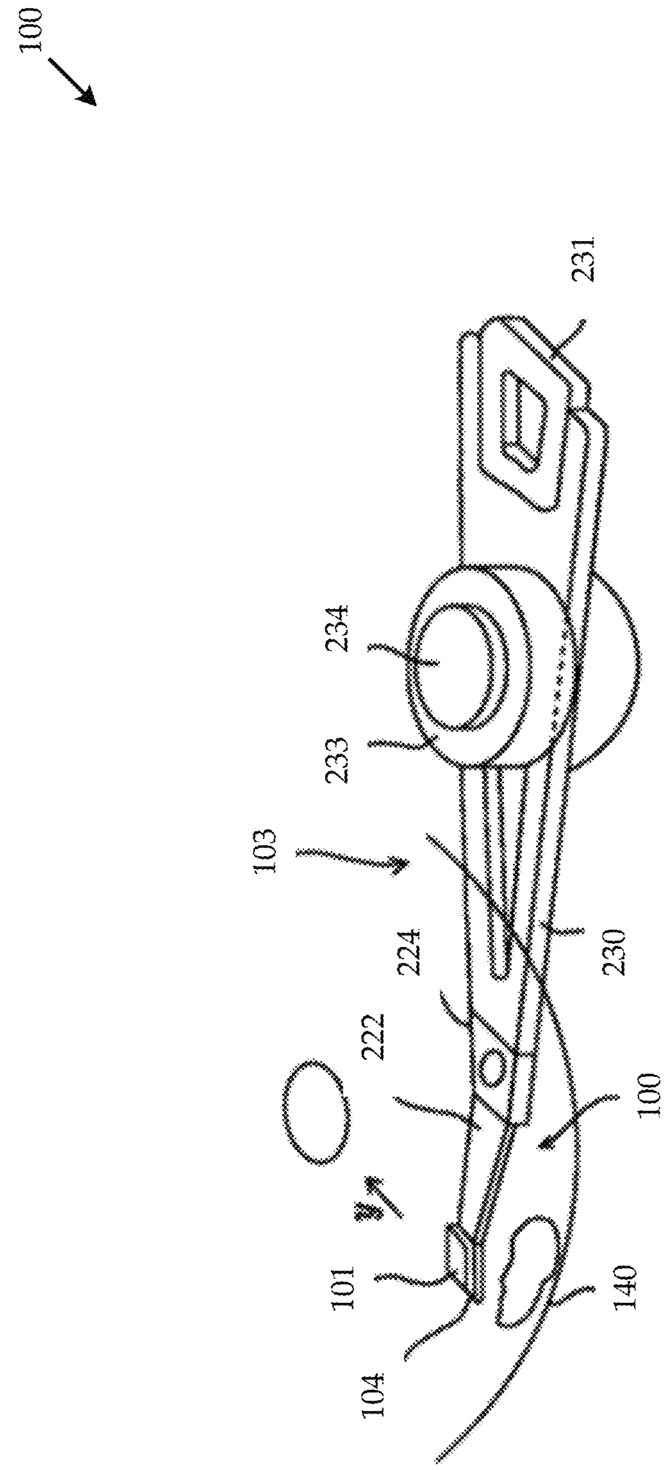
FIG. 1 is a perspective view of an example head gimbal assembly, according to some embodiments.
Figure 2:
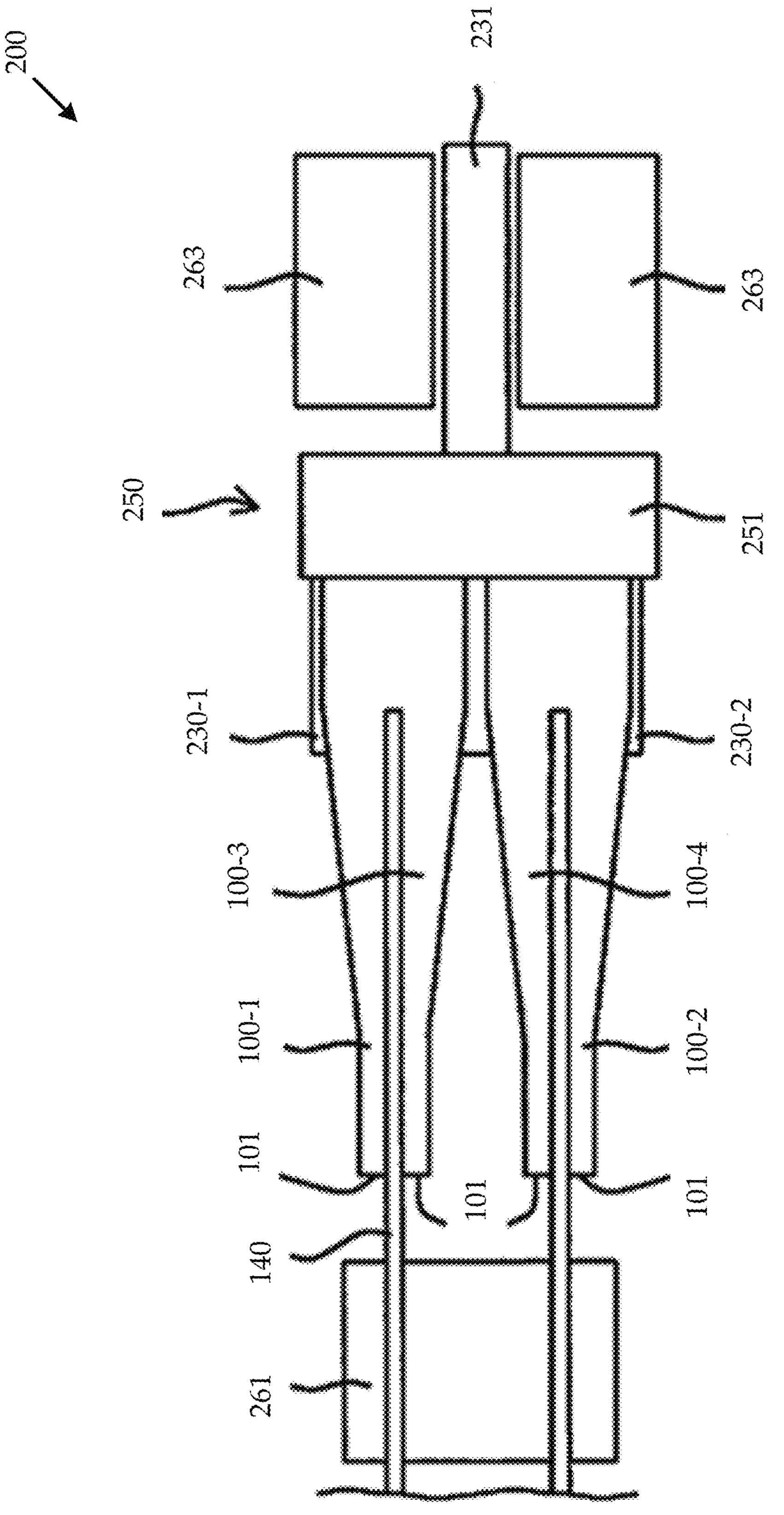
FIG. 2 is a side view of a head stack assembly, according to some embodiments.

A write head can be part of a hard disk drive (HDD) system. For instance, the head can include a slider and a write structure as described herein, with a suspension configured to support the head. FIG. 1 is a perspective view of an example head gimbal assembly 100, according to some embodiments of the present disclosure. The head and LD as described herein can be part of an assembly comprising components as described with respect to FIGS. 1-3.

Referring to FIG. 1, a head gimbal assembly (HGA) 100 includes a magnetic recording head 101 and a writer structure formed thereon, and a suspension 103 that elastically supports the magnetic recording head. The suspension 103 has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

The suspension is mounted on an arm 230 formed in the head gimbal assembly 100. The arm moves the magnetic recording head 101 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator. The suspension generally includes one or more additional micro and/or milli actuators (not shown) to provide finer control of the magnetic recording head 101 over the magnetic recording medium 140.

Next, a side view 200 of a head stack assembly (FIG. 2) and a plan view 300 of a magnetic recording apparatus (FIG. 3) wherein the magnetic recording head 101 is incorporated are depicted. The head stack assembly 250 is a member to which a plurality of HGAs (HGA 100-1 and second HGA 100-2 are at outer positions while HGA 100-3 and HGA 100-4 are at inner positions) is mounted to arms 230-1, 230-2, respectively, on carriage 251. A HGA is mounted on each arm at intervals so as to be aligned in the perpendicular direction (orthogonal to magnetic medium 140). The coil portion (631 in FIG. 1) of the voice coil motor is mounted at the opposite side of each arm in carriage 251. The voice coil motor has a permanent magnet 263 arranged at an opposite position across the coil 231.

Figure 3:
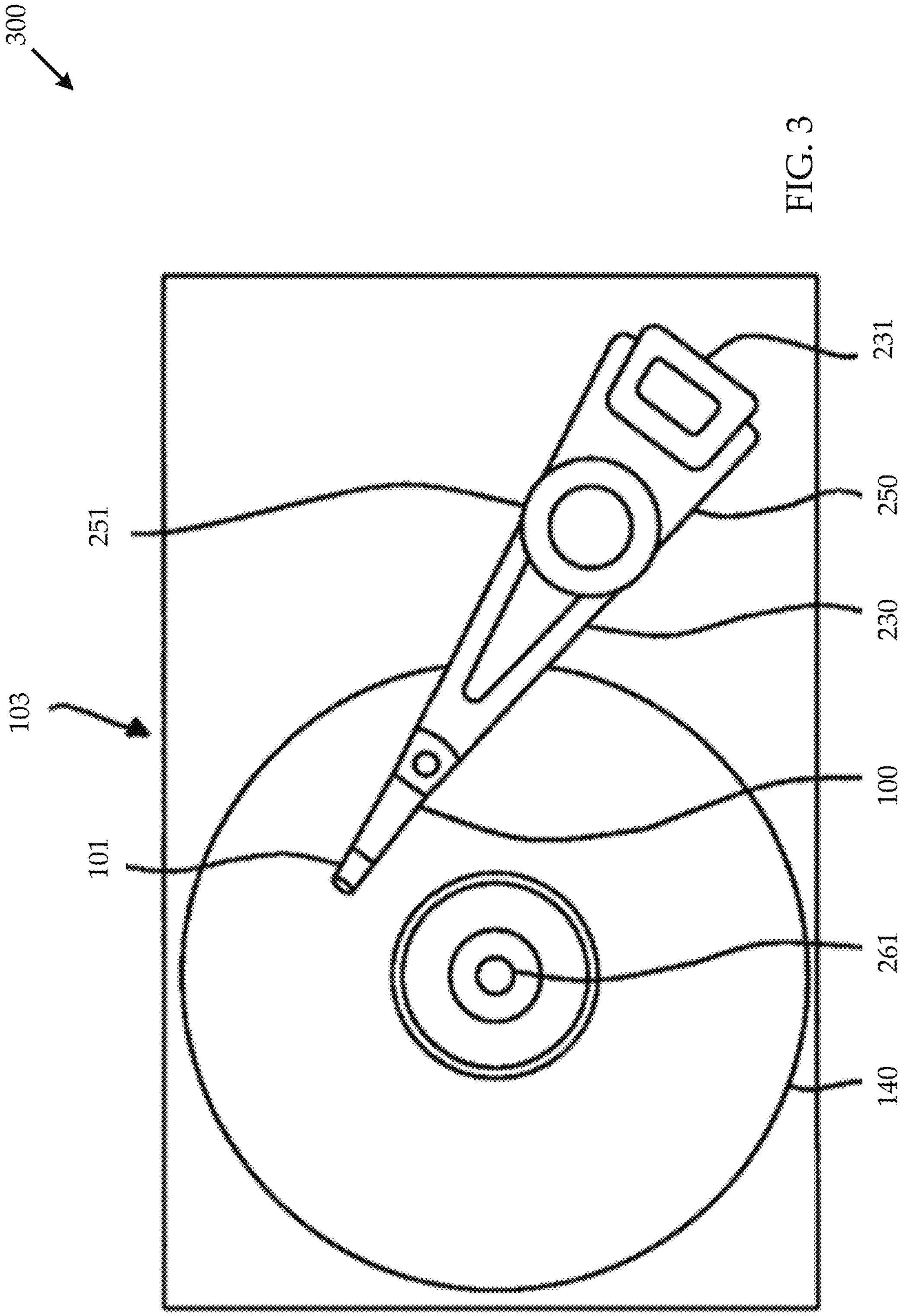
FIG. 3 is a plan view of a magnetic recording apparatus, according to some embodiments.

With reference to FIG. 3, the head stack assembly 250 is incorporated in a magnetic recording apparatus 200. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 101 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a writer element (not shown) and reproduces the information recorded in the magnetic recording media by a sensor element (not shown).

As data areal density in hard disk drives (HDD) writing increases, both write heads and media bits may be generally needed to be made smaller. However, with the decreasing sizes of the writers, their writability degrades. Some write head designs are configured to assist writing, and apart from the thermally assisted magnetic recording (TAMR) that has a completely different geometry from that of the perpendicular magnetic recording (PMR) without assist, there are three major categories that belong to the current assisted magnetic recording.

A first example category can use spin torque devices to generate high frequency field to help writing, such as microwave assisted magnetic recording (MAMR). A second example category can include using spin torque to reverse a layer in the device in order to guide the magnetic flux more concentrated from the main pole, such as spin torque reversal assisted magnetic recording (STRAMR). A third example category can include using a charge current to generate Oested fields for improving jitter of the writer.

Figure 4:
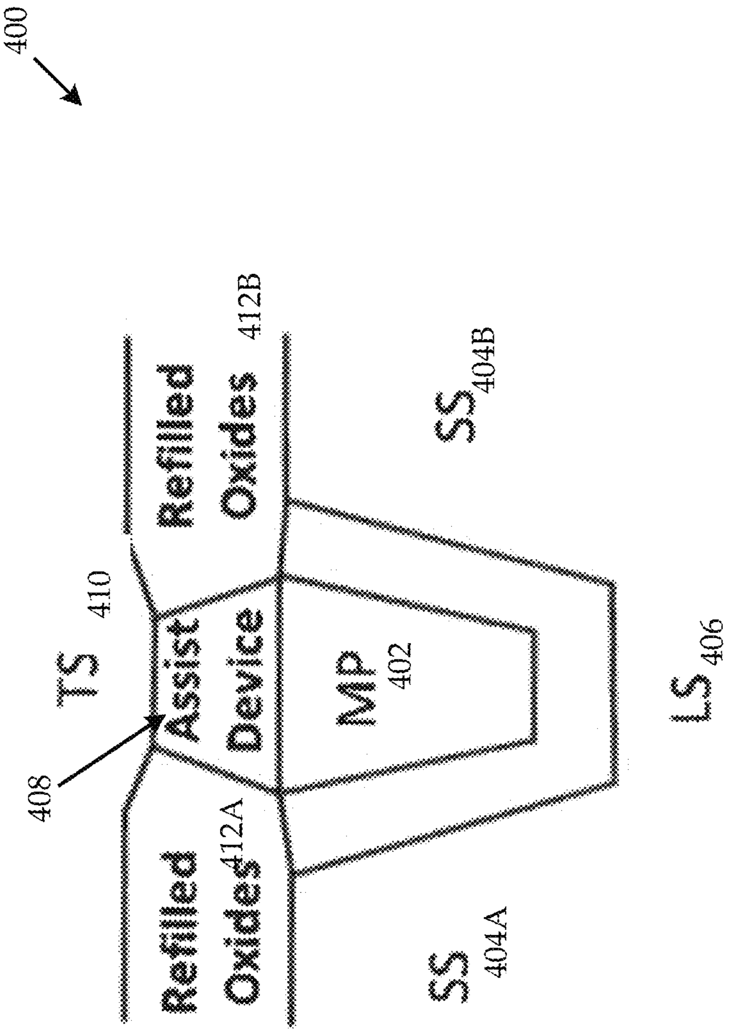
FIG. 4 is an example writer and assist device from the air bearing surface (ABS), according to some embodiments.

FIG. 4 is an example write head 400 with assist device 408 from the air bearing surface (ABS) according to the present embodiments. The write head of FIG. 4 can be included in any of the example categories noted above. As shown in FIG. 4, a main pole (MP) 402 can be surrounded by side shields (SS) 404A, 404B and a leading shield 406. An assist device 408, such as an spin torque oscillator (STO) for example, can be disposed above MP 402. Oxides 412A, 412B can be disposed adjacent to the assist device 408 and a trailing shield (TS) 410. Oxides 412A-B can be refilled oxides (e.g., oxide materials disposed in openings adjacent to the assist device 408.

The write head 400 can include oxides (otherwise known as "Refilled Oxides," which may be formed via an ion-beam etching (IBE) process in the cross track direction. Example oxides can include one or more of Aluminum oxide (AlOx), Magnesium Oxide (MgO), Tantalum Oxide (TaOx), Silicon Oxide (SiOx), etc., to refill the side edges of the assist device 408 to restrict the current between the MP 402 and the write shield in the trailing direction of the head movement within the assist device 408.

Local current density inside the device can high so that the local temperature rise can become tens to hundreds of degrees Celsius. As a result, the reliability can become poor, since such temperature rise leads to ABS oxidation, local corrosion, mechanical deformation, protrusion and erosion, and sometimes electrical migration may occur. In these cases, lifetime of the assist device and surrounding regimes can be shorter than what may be needed by a HDD product. Within the reliability limit, the assist from the device can become limited.

The present embodiments can provide a design with an improved heat conductance that takes part of the undesirable Joule heat away from the assist device more efficiently so that the temperature rise inside and around the assist device becomes lower. The designs as described herein can also allow additional current into the assist device to maximize the assist.

The advantages of the disclosed spin torque assisted recording head design can be to improve thermal conductivity on the side edges of the assist device. As a result, under the same applied current in the assist device, heat generated by the current in the assist device can be well transmitted to the sides, so that the temperature rise around the assist device becomes lower, and the device reliability is improved. With these designs, the reliability problems such as air-bearing-surface (ABS) oxidation, local corrosion, mechanical deformation, protrusion, erosion, and electrical migration, can thus be improved or even avoided. Further, the designs as described herein can enable additional current into the assist device under allowable temperature rise so that the assist can be maximized.

The present embodiments can provide structures in the refill area on the two sides of the assist device. To reduce the temperature rise, oxides with poor thermal conductivity can be changed to materials with higher thermal conductivity. The designs as described herein can replace an insulator that are typically oxides, with insulators with a better thermal conductivity. The possible options can be nitride materials such as SiNx, AlNx, or mixtures of such materials, that can possibly increase the thermal conductivity by several to several hundred times compared to that of conventional oxides.

Another structure can be to replace part of the refilled oxides to metals with far higher thermal conductivity. However, metals are generally mostly electrical conductors. In order to restrict most of the electrical current within or around the assist device, some insulators can still be used in the write heads.

Figure 5:
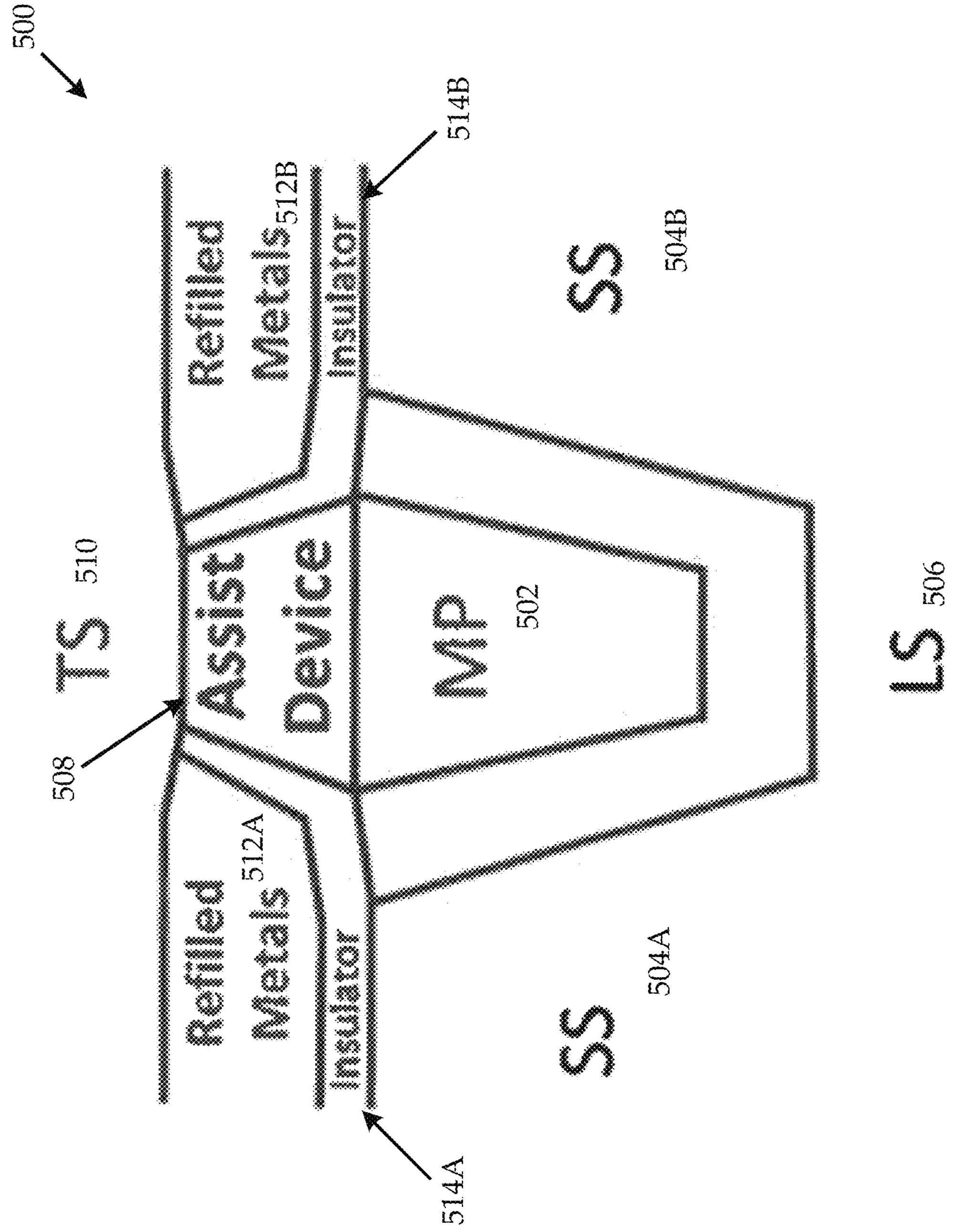
FIG. 5 is an example view of a write head with refilled sides and insulators disposed adjacent to the assist device, according to some embodiments.

FIG. 5 is an example view of a write head 500 with metals and insulators disposed adjacent to the assist device. As shown in FIG. 5, the assist device 508 can be disposed between a TS 510 and a MP 502. The SS 504A-B and the LS 506 can surround the MP 502. Metals 512A-B (or "Refilled Metals") can be disposed on sides of the assist device 508. The metals 512A-B can be refilled in openings adjacent to the assist device 608. Further, insulators 514A, 514B can be disposed between the refilled metals 512A-B on a first side and the assist device 508 and SS 504A-B on a second side. The insulator 514A-B can be thinner than the refilled metals 512A-B.

In some instances, after an etching process (IBE) is performed to the assist device 508, an insulator 514A-B that can be several nanometers in thickness can be deposited on the side edges of the assist device 508 and on top of the exposed surface of the side shield (SS) 504A-B. The materials of this insulator can include oxides, nitrides, and combinations thereof. Then, refilled metals 512A-B can be deposited on top to fill the spacing between the MP 502 and the TS 510. Possible choices of such refilled metals 512A-B can include non-magnetic metals such as Ruthenium (Ru), Titanium (Ti), Tantalum (Ta), alloys such as Nickel-Chrome (NiCr), etc., or multilayers of these materials.

In some instances, alternating layers of materials can be applied with positive and negative mechanical stress in the deposition to avoid some process difficulties. In this way, the electrical current still can flow between the MP and the TS via the assist device only, but the metal refill several nm away from the assist device can be used as a heat sink to prevent excessive temperature rise around and inside the assist device. This can improve the reliability of the device, and can enable additional current in the assist device to maximize the assist under the allowable temperature rise.

Figure 6:
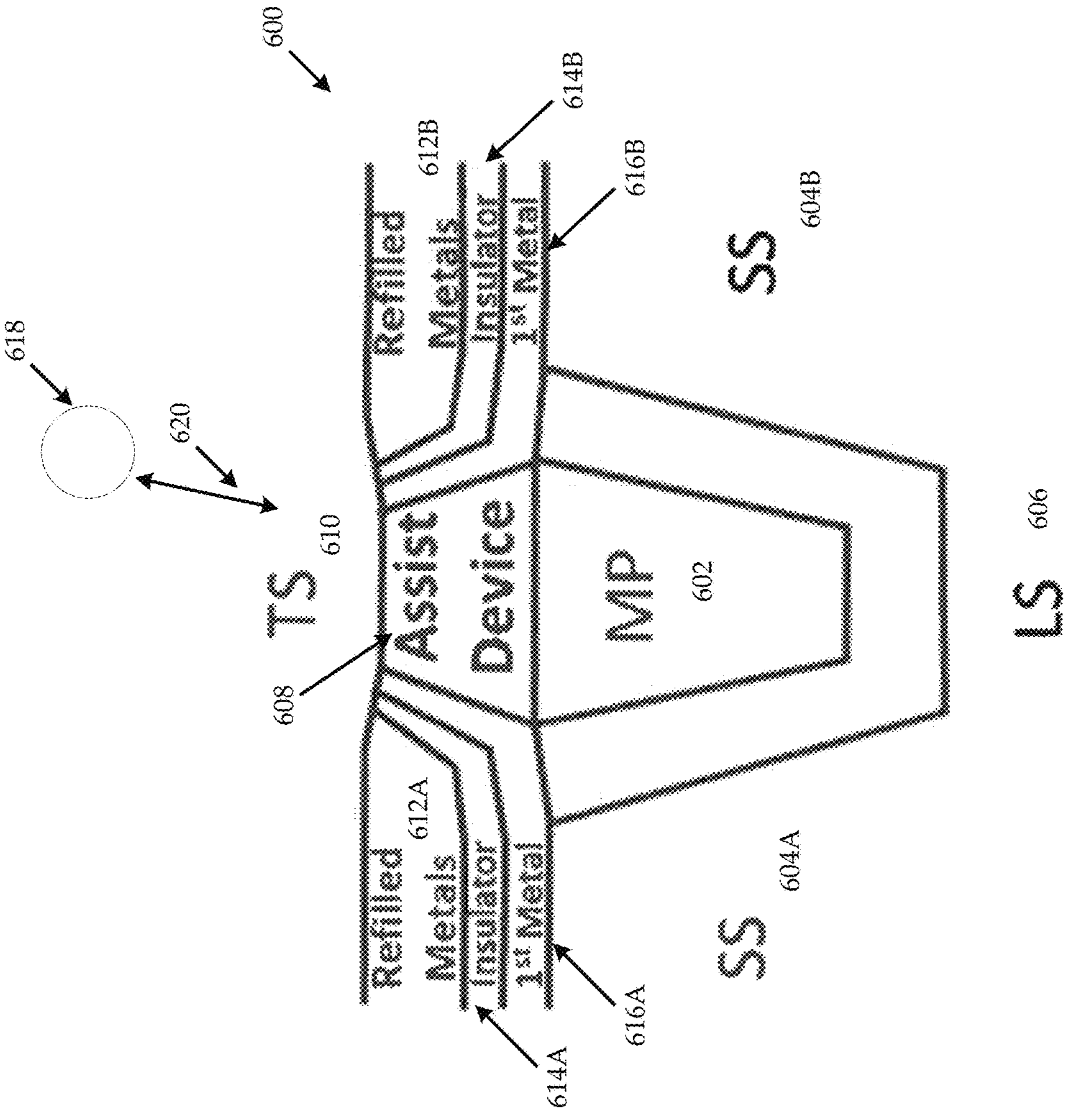
FIG. 6 is an example view of a write head with refilled sides, insulators, and an additional metal layer disposed adjacent to the assist device, according to some embodiments.

In the structures as described with respect to FIG. 6, a further additional charge current can be applied via the 1st metal layer to further enhance the charge current induced assist. FIG. 6 is an example view of a write head 600 with refilled sides, insulators, and an additional metal layer disposed adjacent to the assist device. As shown in FIG. 6, the assist device 608 can be disposed between a TS 610 and a MP 602. The SS 604A, 604B and the LS 606 can surround the MP 602. Refilled metals 612A, 612B can be disposed on sides of the assist device 608. Further, a first metal layer 616A, 616B (or "additional metal layers") can be disposed between the insulator layer 614A, 614B and refilled metals 612A-B on a first side and the assist device 608 and SS 604A-B on a second side. The insulator 614A-B can be have a thickness similar to that of the first metal layer 616A-B. Further, a current source 618 can provide a current 620 to the write head as described herein.

After an etching process to the assist device, a first non-magnetic metal layer 616A-B can be deposited right next to the side edges of the assist device 608 and on top of the exposed SS 614A-B. Then, the insulator 614A-B can be deposited on top, which can be composed of oxides, nitrides, and/or their combinations. Then refilled metals 612A-B can be fill the remaining spacing before the TS 610. The refilled metals 612A-B can include a thickness less than the refilled metals 512A, 512B described in FIG. 5.

Both the first metal layer and the refilled metals on top can be composed of non-magnetic materials such as Ru, Ti, Ta, alloys such as NiCr, and/or multilayers of those materials. The design as described in FIG. 6 can further allow additional charge current via the first metal layer to enhance the charge current induced assist.

The possible assist devices can use spin torque devices to generate high frequency field to help writing, use spin torque to reverse a layer in the device in order to guide the magnetic flux more concentrated from the main pole, or use a charge current to generate Oested fields for improving jitter of the writer, as described above. Further, the materials between the MP and the leading shield (LS)/side shield (SS) can be insulators, or conducting metals, where charge current can possibly be applied between the MP and the LS/SS. Designs for spin and/or charge current induced assist in HDD writer can include a magnetic main pole (MP) that provides a strong and concentrated field to write the medium bit. A trailing write shield (TS) that is used to collect magnetic flux back to the writer An assist device located in the write gap between the MP and the TS, via which the current passes between the MP and the TS to utilize spin current and/or charge current to assist the write process. The gap between the MP and the leading shield (LS)/side shield (SS) can be either insulating materials, or conducting metals, where charge current can possibly be applied between the MP and the LS/SS. A current source to provide a dc and/or ac bias current from the TS to the MP through the said assist device. The mentioned assist device can be etched at the side edges, and materials can be filled between the exposed SS surface and the upper TS.

In some instances, the oxide materials disposed adjacent to the assist device can be changed to insulating materials with better thermal conductivity, such as nitrides.

In some instances, the refilled materials on the sides can start with insulating layer(s) followed by non-magnetic metals. In some examples, the refilled materials on the sides can start with a 1st metal layer, and then insulating layer(s) followed by non-magnetic metal(s). The insulating layer(s) can be single layer oxide, nitride, insulating compounds, or multilayered insulators.

In some instances, the first metal layer and non-magnetic metal(s) above the insulator can be Ru, Ta, Ti, etc., alloys like NiCr, or compounds or multilayered metals.

In the present deigns, heat generated by the current in the assist device can be well transmitted to the sides under the same applied current in the assist device, so that the temperature rise around the assist device becomes lower, and the device reliability is improved. The reliability problems such as air-bearing-surface (ABS) oxidation, local corrosion, mechanical deformation, protrusion, erosion, and electrical migration, can thus be improved or even avoided.

In some instances, an additional current can be sent into the assist device under allowable temperature rise so that the assist can be maximized. In some instances, further additional charge current can be applied in the 1st metal layer to further enhance the charge current induced assist.

In a first example embodiment, a write head is described. The write head can include a main pole (MP). The write head can also include side shield portions disposed adjacent to the main pole. The write head can also include a trailing shield (TS). The write head can also include an assist device located in a write gap between the MP and the TS.

The write head can also include a set of insulator layers disposed on sides of the assist device and over part of an upper surface of the side shield portions. The write head can also include a set of refilled metal layers disposed over the insulator layer.

In some instances, each of the set of refilled metal layers disposed at the TS on a first side and on the set of insulator layers on a second side.

In some instances, each of the set of insulator layers disposed adjacent to the assist device and the side shield portions at a first side and the set of refilled metal layers on a second side.

In some instances, the write head further comprises a current source to provide a current from the TS to the MP through the assist device, wherein heat generated by the current in the assist device can be well transmitted to the set of refilled metal layers under a same applied current in the assist device so that a temperature rise around the assist device is reduced and a device reliability is improved.

In some instances, the assist device is etched via an ion-beam etching process to remove a portion of the assist device prior to depositing the set of insulation layers.

In some instances, the write head further comprises a set of metal layers disposed over the side shield portions and the assist device on a first side and adjacent to the set of insulator layers on a second side.

In some instances, wherein any of the set of refilled metal layers and the set of metal layers comprise a any of a set of metals including Ruthenium, Titanium, Tantalum, a Nickel-Chromium alloy, or a multi-layer of any of the set of metals.

In some instances, the set of refilled metal layers comprise a plurality of metal layer with alternative positive and negative mechanical stress.

In some instances, the set of refilled metal layers has a thickness greater than that of the set of insulator layers.

In some instances, the write head is part of a recording device in a head gimbal assembly, wherein the recording device is connected to a slider and a load beam, wherein the load beam is connected to a suspension configured to support the recording device and the slider.

In another example embodiment, a head gimbal assembly is described. The head gimbal assembly can include a recording head including a slider and a device connected to the slider.

The device can include a main pole (MP) and side shield portions disposed adjacent to the main pole. The device can also include a trailing shield (TS) and an assist device located in a write gap between the MP and the TS. The device can also include a set of insulator layers disposed on sides of the assist device and over part of an upper surface of the side shield portions. The device can also include a set of refilled metal layers disposed over the insulator layer.

The head gimbal assembly can also include a load beam connected to the recording head. The head gimbal assembly can also include a suspension connected to the load beam and configured to support the recording head.

In some instances, each of the set of refilled metal layers disposed at the TS on a first side and on the set of insulator layers on a second side.

In some instances, each of the set of insulator layers disposed adjacent to the assist device and the side shield portions at a first side and the set of refilled metal layers on a second side.

In some instances, the write head can further include a current source to provide a current from the TS to the MP through the assist device, wherein heat generated by the current in the assist device can be well transmitted to the set of refilled metal layers under a same applied current in the assist device so that a temperature rise around the assist device is reduced and a device reliability is improved.

In some instances, the write head can further include a set of metal layers disposed over the side shield portions and the assist device on a first side and adjacent to the set of insulator layers on a second side.

In some instances, any of the set of refilled metal layers and the set of metal layers comprise a any of a set of metals including Ruthenium, Titanium, Tantalum, a Nickel-Chromium alloy, or a multi-layer of any of the set of metals.

Figure 7:
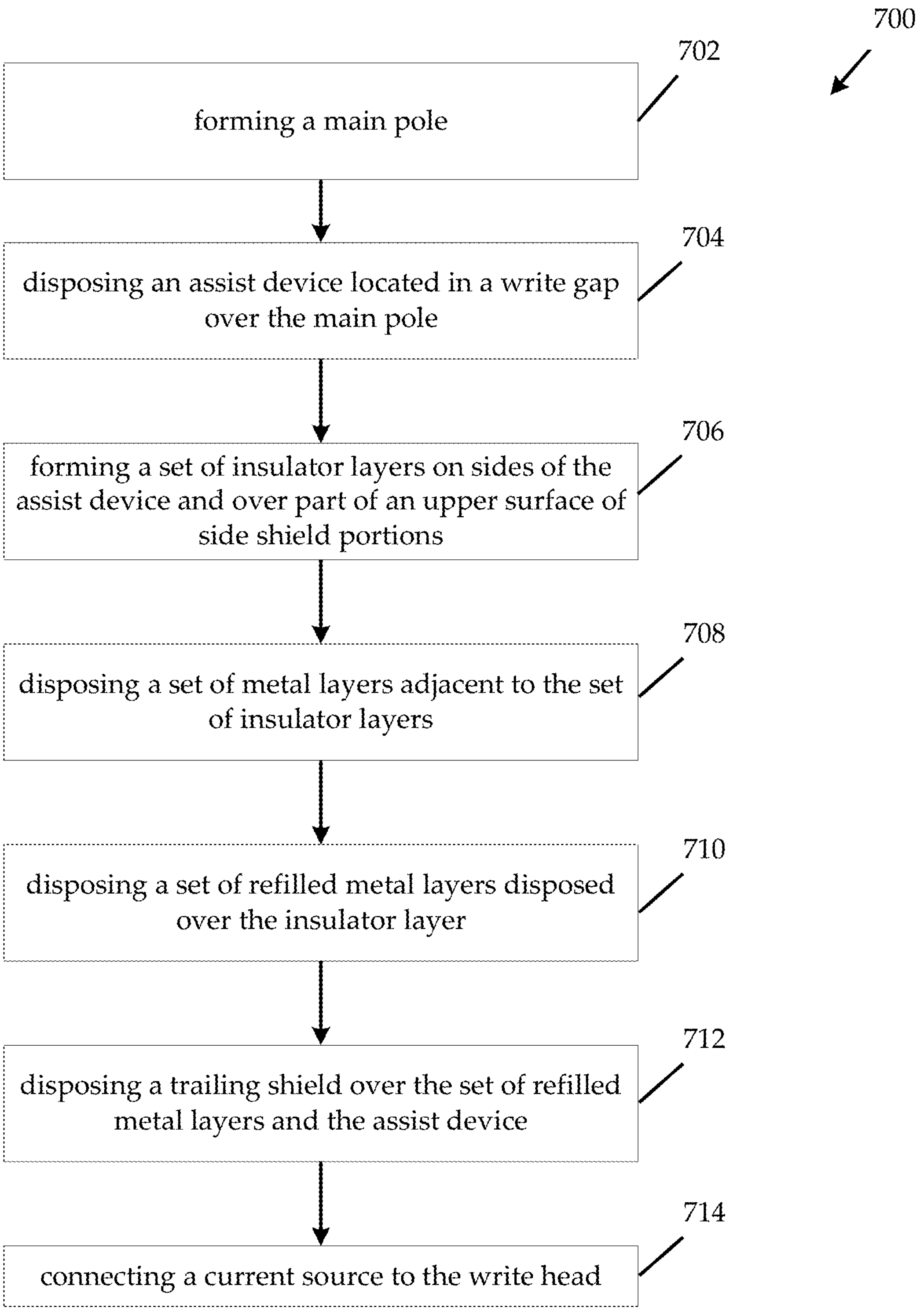
FIG. 7 is an example flow process for manufacturing a write head, according to some embodiments.

FIG. 7 is an example flow process 700 for manufacturing a write head. At 702, the method can include forming a main pole. At 704, the method can include disposing an assist device located in a write gap over the main pole.

At 706, the method can include forming a set of insulator layers on sides of the assist device and over part of an upper surface of the side shield portions. At 708, the method can further include disposing a set of metal layers between the set of insulator layers on a first side and over the part of the upper surface of the side shield portions and the assist device on a second side.

At 710, the method can include disposing a set of refilled metal layers disposed over the insulator layer. At 712, the method can further include disposing a trailing shield over the set of refilled metal layers and the assist device.

At 714, the method can further include connecting a current source to the write head. The current source can provide a current from the TS to the MP through the assist device, wherein heat generated by the current in the assist device can be well transmitted to the set of refilled metal layers under a same applied current in the assist device so that a temperature rise around the assist device is reduced and a device reliability is improved.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A write head comprising:
- a main pole (MP);
- side shield portions disposed adjacent to the main pole;
- a trailing shield (TS);
- an assist device located in a write gap between the MP and the TS;
- a set of insulator layers disposed on sides of the assist device and over part of an upper surface of the side shield portions; and
- a set of metal layers disposed over each of the set of insulator layers.

2. The write head of claim 1, wherein each of the set of metal layers are disposed at the TS on a first side and on the set of insulator layers on a second side.

3. The write head of claim 1, wherein each of the set of insulator layers disposed adjacent to the assist device and the side shield portions at a first side and the set of refilled metal layers on a second side.

4. The write head of claim 1, further comprising:
- a current source to provide a current from the TS to the MP through the assist device, wherein heat generated by the current in the assist device can be well transmitted to the set of metal layers under a same applied current in the assist device so that a temperature rise around the assist device is reduced and a device reliability is improved.

5. The write head of claim 1, wherein the assist device is etched via an ion-beam etching process to remove a portion of the assist device prior to depositing the set of insulator layers.

6. The write head of claim 1, further comprising:
- a set of additional metal layers disposed over the side shield portions and the assist device on a first side and adjacent to the set of insulator layers on a second side.

7. The write head of claim 6, wherein any of the set of metal layers and the set of additional metal layers comprise a any of a set of metals including Ruthenium, Titanium, Tantalum, a Nickel-Chromium alloy, or a multi-layer of any of the set of metals.

8. The write head of claim 1, wherein the set of metal layers comprise a plurality of layers with alternative positive and negative mechanical stress.

9. The write head of claim 1, wherein the set of metal layers has a thickness greater than that of the set of insulator layers.

10. The write head of claim 1, wherein the write head is part of a recording device in a head gimbal assembly, wherein the recording device is connected to a slider and a load beam, wherein the load beam is connected to a suspension configured to support the recording device and the slider.

11. A head gimbal assembly comprising:
- a recording head including a slider and a device connected to the slider, the device including:
  - a main pole (MP);
  - side shield portions disposed adjacent to the main pole;
  - a trailing shield (TS);
  - an assist device located in a write gap between the MP and the TS;
  - a set of insulator layers disposed on sides of the assist device and over part of an upper surface of the side shield portions; and
  - a set of metal layers disposed over each of the set of insulator layers;
- a load beam connected to the recording head; and
- a suspension connected to the load beam and configured to support the recording head.

12. The head gimbal assembly of claim 11, wherein each of the set of metal layers disposed at the TS on a first side and on the set of insulator layers on a second side.

13. The head gimbal assembly of claim 11, wherein each of the set of insulator layers disposed adjacent to the assist device and the side shield portions at a first side and the set of metal layers on a second side.

14. The head gimbal assembly of claim 11, further comprising:

a current source to provide a current from the TS to the MP through the assist device, wherein heat generated by the current in the assist device is transmitted to the set of metal layers under a same applied current in the assist device so that a temperature rise around the assist device is reduced and a device reliability is improved.

15. The head gimbal assembly of claim 11, further comprising:

a set of additional metal layers disposed over the side shield portions and the assist device on a first side and adjacent to the set of insulator layers on a second side.

16. The head gimbal assembly of claim 15, wherein any of the set of metal layers and the set of additional metal layers comprise a any of a set of metals including Ruthenium, Titanium, Tantalum, a Nickel-Chromium alloy, or a multi-layer of any of the set of metals.

17. A method for manufacturing a write head, the method comprising:

forming a main pole;

disposing an assist device located in a write gap over the main pole;

forming a set of insulator layers on sides of the assist device and over part of an upper surface of each of a set of side shield portions; and disposing a set of metal layers disposed over each of the set of insulator layers.

18. The method of claim 17, further comprising:

disposing a trailing shield over the set of metal layers and the assist device.

19. The method of claim 17, further comprising:

disposing a set of additional metal layers between the set of insulator layers on a first side and over the part of the upper surface of each of the side shield portions and the assist device on a second side.

20. The method of claim 18, further comprising:

connecting a current source to the write head to provide a current from the trailing shield to the main pole through the assist device, wherein heat generated by the current in the assist device is transmitted to the set of metal layers under a same applied current in the assist device so that a temperature rise around the assist device is reduced and a device reliability is improved.

* * * * *